United States Patent
Bull et al.

(10) Patent No.: US 8,160,145 B2
(45) Date of Patent: Apr. 17, 2012

(54) VIDEO ERROR CONCEALMENT WITH SPATIAL AND TEMPORAL ERROR CONCEALMENT

(75) Inventors: David Roger Bull, Chepstow (GB); Dimitris Agrafiotis, Bristol (GB)

(73) Assignee: ProVision Communication Technologies Ltd., Bristol (GB)

( * ) Notice: Subject to any disclaimer, the term of this patent is extended or adjusted under 35 U.S.C. 154(b) by 1026 days.

(21) Appl. No.: 11/794,922

(22) PCT Filed: Jan. 6, 2006

(86) PCT No.: PCT/GB2006/000036
§ 371 (c)(1),
(2), (4) Date: Feb. 7, 2008

(87) PCT Pub. No.: WO2006/072793
PCT Pub. Date: Jul. 13, 2006

(65) Prior Publication Data
US 2008/0186404 A1 Aug. 7, 2008

(30) Foreign Application Priority Data
Jan. 8, 2005 (GB) .................................. 0500332.2

(51) Int. Cl.
*H04N 7/12* (2006.01)
(52) U.S. Cl. ............................... 375/240.16; 375/240.27
(58) Field of Classification Search .......... 375/240.16–240.17, 240.27
See application file for complete search history.

(56) References Cited

U.S. PATENT DOCUMENTS
6,636,565 B1 10/2003 Kim
2003/0161402 A1* 8/2003 Horowitz ................. 375/240.16
(Continued)

FOREIGN PATENT DOCUMENTS
EP  0 727 910  8/1996

OTHER PUBLICATIONS

Kim et al, A motion vector recovery algorithm for temporal Error concealment using optical flow in H.264 video coding, 2006 IEEE, 4 pages.*

(Continued)

*Primary Examiner* — Ayaz Sheikh
*Assistant Examiner* — Mounir Moutaouakil
(74) *Attorney, Agent, or Firm* — Foley & Lardner LLP

(57) ABSTRACT

A temporal error concealment is described. A video stream comprises a current frame comprising a lost image region, and a reference frame. The method comprises forming a list of motion vector candidates, the list of motion vector candidates including a set of one or more motion vectors from the current frame and a set of one or more motion vectors from the reference frame; testing each of the motion vector candidates using a matching error measure; selecting a replacement motion vector from the list based on the matching error measures; and using the selected replacement motion vector to conceal the lost image region. A mode selection method is also described. A motion vector is used to identify a motion compensated reference image region in the reference frame. A motion compensated temporal activity of an image region in the current frame is calculated based on a comparison between the image region in the current frame and the motion compensated reference image region in the reference frame. A spatial or temporal error concealment mode is then selected based on the calculated temporal activity.

11 Claims, 5 Drawing Sheets

U.S. PATENT DOCUMENTS

| | | | |
|---|---|---|---|
| 2004/0139462 A1* | 7/2004 | Hannuksela et al. | 725/32 |
| 2005/0254584 A1 | 11/2005 | Kim et al. | |
| 2007/0189398 A1* | 8/2007 | Hannuksela et al. | 375/240.27 |
| 2008/0044094 A1* | 2/2008 | Jeon et al. | 382/236 |
| 2008/0152003 A1* | 6/2008 | Oguz | 375/240.12 |
| 2008/0205526 A1* | 8/2008 | Kang | 375/240.16 |
| 2008/0267299 A1* | 10/2008 | Hannuksela et al. | 375/240.27 |
| 2009/0086819 A1* | 4/2009 | Huang et al. | 375/240.13 |
| 2009/0086828 A1* | 4/2009 | Huang et al. | 375/240.27 |
| 2009/0116557 A1* | 5/2009 | Nair | 375/240.16 |
| 2009/0257512 A1* | 10/2009 | Demas et al. | 375/240.27 |
| 2010/0118970 A1* | 5/2010 | Ye et al. | 375/240.16 |
| 2010/0150253 A1* | 6/2010 | Kuo et al. | 375/240.27 |

OTHER PUBLICATIONS

Agrafiotis et al., "Seamless Wireless Networking for Video Surveillance Applications," Provision Communication Technologies, SPIE Proc. Image and Video Communications and Processing 2005, Jan. 2005, pp. 1-15.

Belfiore et al., "Spatiotemporal Error Concealment with Optimized Mode Selection and Application to H.264," Signal Processing Image Communication, Elsevier Science Publishers, vol. 18, No. 10, Nov. 2003, pp. 907-923.

Chen et al., "Error Concealment of Lost Motion Vectors with Overlapped Motion Compensation," IEEE Transaction on Circuits and Systems for Video Technologies, vol. 7, No. 3, Jun. 1997, pp. 560-563.

Chen, "Refined Boundary Matching Algorithm for Temporal Error Concealment," Packet Video, 2002, 11 Sheets.

Dufour et al., "An Efficient Error Concealment Implementation for MPEG4 Video Streams," IEEE Trans. in Consumer Electronics, vol. 47, No. 3, 2001, pp. 290-291.

Hong et al., "Error Concealment Algorithms for Compressed Video," Signal Processing: Image Communication, vol. 14, 1999, pp. 473-492.

Kuo et al., "Error Concealment Based on Overlapping," Visual Communication and Image Processing, 2002, pp. 146-153.

Kuo et al., "Hybrid Temporal-Spatial Error Concealment Technique for Video Communications," Multimedia and Expo., 2004. ICME '04.2004 IEEE International Conference on Taipei, Taiwan, Jun. 27-30, 2004, pp. 1743-1746.

Lam et al., "Recovery of Lost or Erroneously Received Motion Vectors," ICASSP, IEEE, 1993, pp. 417-420.

Salama et al., "Error Concealment in Encoded Video Streams," Video and Image Processing Laboratory (VIPER) 1998, pp. 1-36.

Sun et al., "Error Concealment Algorithms for Robust Decoding of MPEG Compressed Video," Signal Processing: Image Communication, vol. 10, 1997, pp. 249-268.

Wang et al., "The Error Concealment Feature in the H.26L Test Model," IEEE ICIP, 2002, pp. 729-732.

Wang et al., "Error Control and Concealment for Video Communication: A Review," Proceedings of the IEEE, vol. 86, No. 5, May 5, 1998, pp. 974-997.

Wang et al., "Error Resilient Video Coding Techniques—Real Time Video Communications Over Unreliable Networks," IEEE Signal Processing Magazine, vol. 17, Jul. 2000, pp. 61-82.

* cited by examiner

VIDEO ERROR CONCEALMENT WITH SPATIAL AND TEMPORAL ERROR CONCEALMENT

FIELD OF THE INVENTION

The present invention relates to a method of concealing an error in a video stream.

BACKGROUND OF THE INVENTION

Transmission/streaming of video over error prone networks is associated with packet erasures when channel conditions are not favourable. To avoid a large drop in video quality at the receiver due to intra- and inter-frame propagation of such errors, error resilience at the encoder and use of error concealment at the decoder are necessary. Error concealment methods described in [Y. Wang, S. Wenger, J. Wen, and A. K. Katsaggelos, "Error Resilient Video Coding Techniques-Real time video communications over unreliable networks," IEEE Signal Processing Magazine, vol. 17, pp. 61-82, 2000] and [Y. Wang and Q.-F. Zhu, "Error Control and Concealment for Video Communication: A Review," Proceedings of the IEEE, vol. 86, pp. 974-997, 1998] estimate lost information by employing the correlation that exists between a missing macroblock (MB) and the temporally and spatially adjacent ones. They can be classified in two categories. Temporal concealment methods estimate lost motion vectors and then use these for motion compensated temporal replacement of the lost MBs. Spatial concealment methods rely on spatially adjacent macroblocks for estimating missing pixels usually through an interpolation process.

Although not normative, the H.264 joint model (1M) decoder implements both spatial and temporal error concealment for missing intra and inter coded macroblocks—see [Y.-K. Wang, M. M. Hannuksela, V. Varsa, A. Hourunranta, and M. Gabbouj, "The error concealment feature in the H.26L test model,", ICIP, USA, 2002]. Temporal concealment (employed solely for lost MBs in P or B frames), is implemented based on the boundary matching algorithm (BMA) described in [W.-M. Lam and A. R. Reibman, "Recovery of lost or erroneously received motion vectors," ICASSP, USA, 1993] which predicts the motion vector (MV) of one missing macroblock out of a list of candidate MVs coming from 4-neighboring MBs (or 8×8 blocks of these) and including the zero MY. The MY that results in the smallest boundary matching error (BME) is then used for motion compensated replacement of the missing pixels from a previously decoded frame. Spatial concealment is employed for intra coded frames.

SUMMARY OF THE INVENTION

A first aspect of the invention provides a method of concealing an error in a video stream, the video stream comprising a current frame comprising a lost image region, and a reference frame, the method comprising using a motion vector to identify a reference image region in the reference frame; calculating a motion compensated temporal activity of an image region in the current frame based on a comparison between the image region in the current frame and the reference image region in the reference frame; selecting a spatial or temporal error concealment mode based on the calculated temporal activity; and concealing the lost image region using the selected error concealment mode.

In the preferred embodiment described below, the lost image region is a macroblock of video pixels, but the lost image region may also be a block or slice of video pixels. In general any spatial or temporal error concealment mode may be used, but in a preferred embodiment a temporal error concealment mode according to the second aspect of the invention is used.

A second aspect of the invention provides a method of concealing an error in a video stream, the video stream comprising a current frame comprising a lost image region, and a reference frame, the method comprising forming a list of motion vector candidates, the list of motion vector candidates including a set of one or more motion vectors from the current frame and a set of one or more motion vectors from the reference frame; testing each of the motion vector candidates using a matching error measure; selecting a replacement motion vector from the list based on the matching error measures; and using the selected replacement motion vector to conceal the lost image region.

In the preferred embodiment described below, the lost image region is a macroblock of video pixels, but the lost image region may also be a block or slice of video pixels.

BRIEF DESCRIPTION OF THE DRAWINGS

An embodiment of the invention will now be described with reference to the accompanying drawings, in which.

DETAILED DESCRIPTION OF EMBODIMENT(S)

Figure 1:
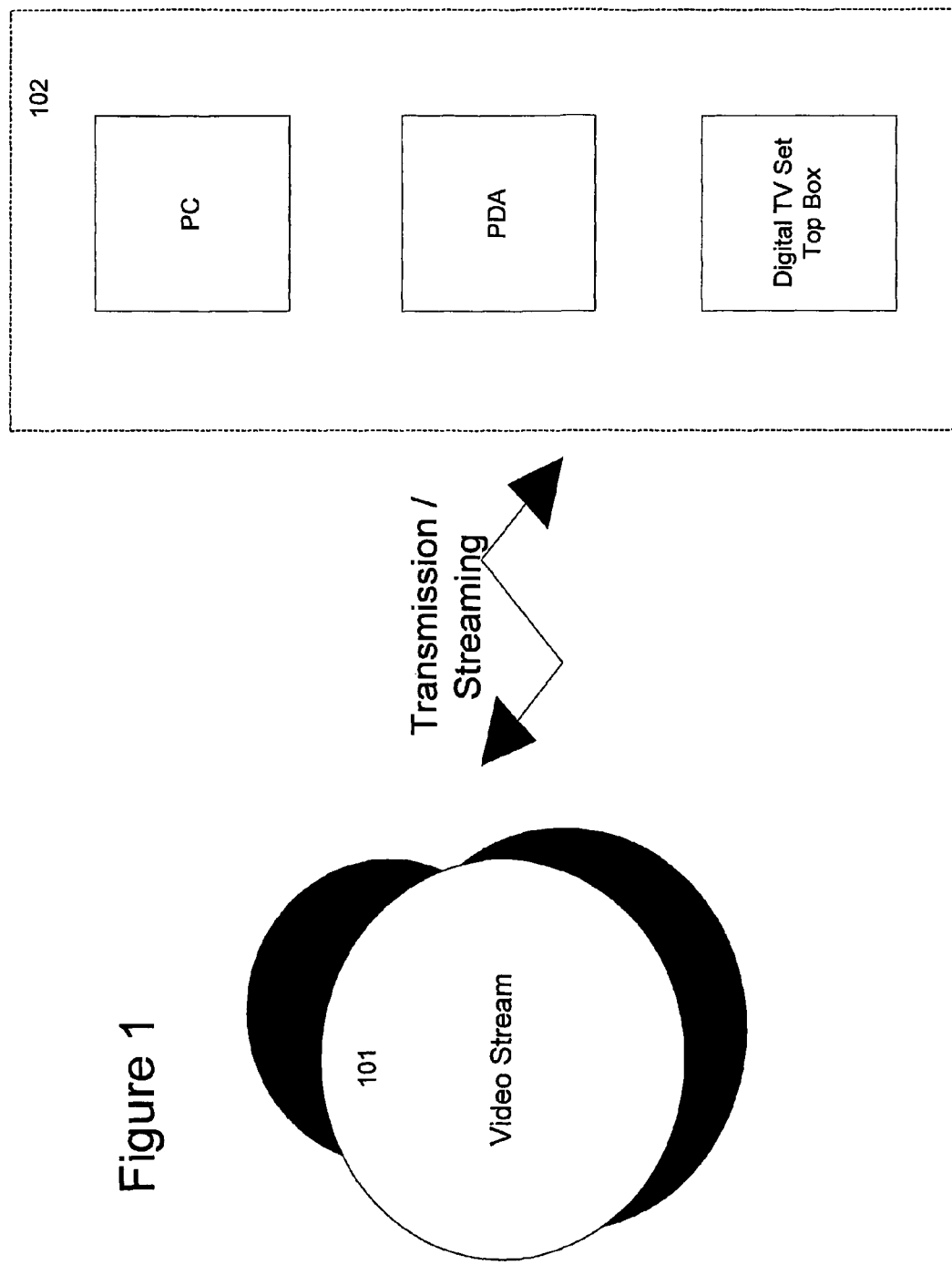
FIG. 1 shows a typical video communication scenario.

FIG. 1 shows a typical video communication scenario, including a video stream 101, and a selection of devices 102 such as Personal Computers (PCs), Personal Digital Assistants (PDAs) and Digital TV Set Top Boxes for receiving the video stream. Each device 102 includes a video decoder which may be implemented in software (for instance in a Digital Signal Processor (DSP)) or in hardware (for instance in a Field Programmable Gate Array (FPGA) or an Application Specific Integrated Circuit (ASIC)). The decoder is configured to decode the video stream and conceal an error in the video stream by the method described below.

Figure 2:
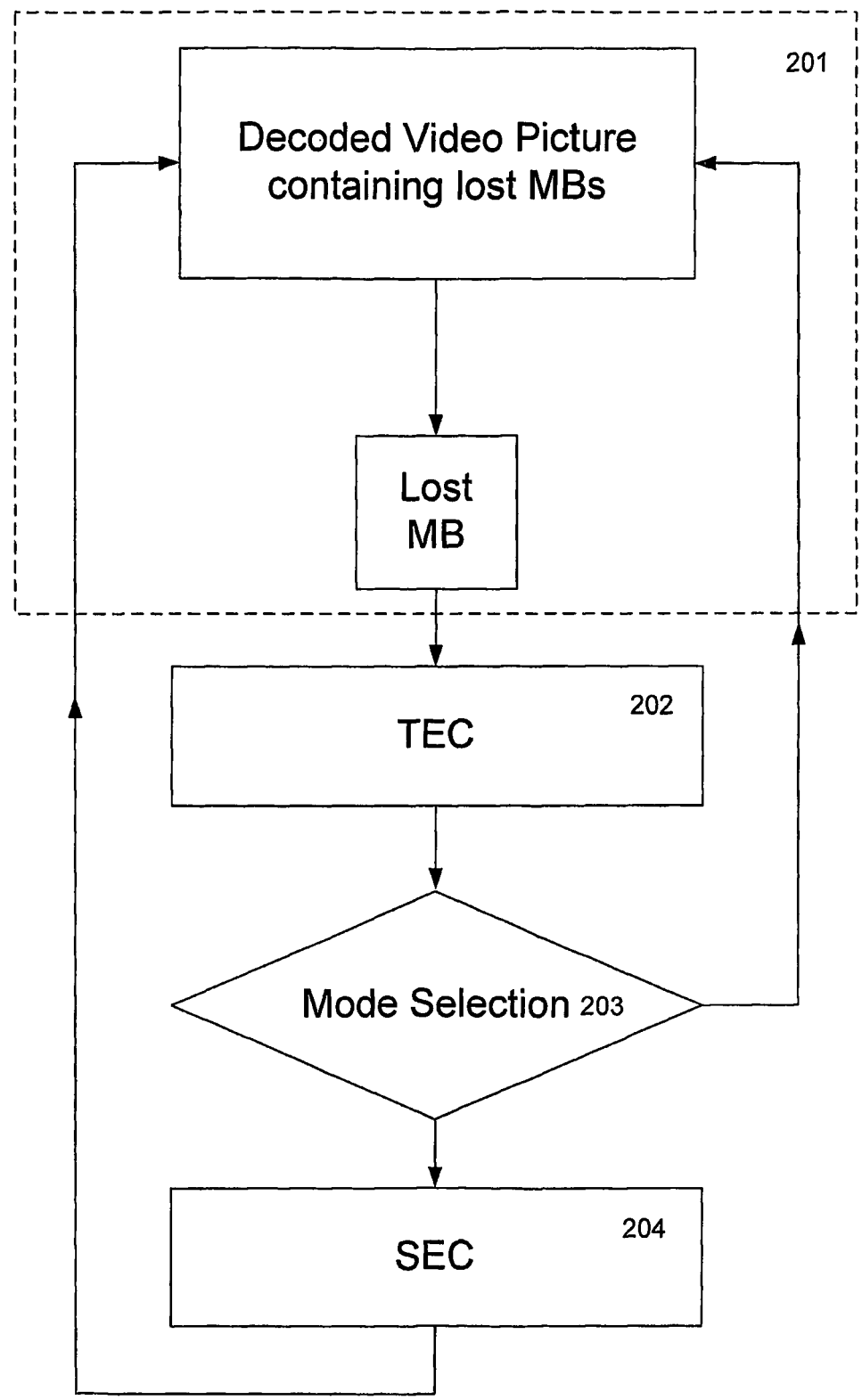
FIG. 2 shows an error concealment method as applied to each lost macroblock (MB) of a decoded video picture.

FIG. 2 shows an error concealment method as applied to each lost macroblock (MB) of a decoded video picture or frame. The method consists of a temporal concealment (TEC) module 202, a mode selection algorithm 203 and a spatial concealment (SEC) module 204. TEC is applied first in order to conceal a lost MB via motion compensated replacement. The mode selection module 203 examines the suitability of the TEC method for concealing the lost MB by evaluating the levels of motion compensated activity in the neighborhood of that MB and switching to spatial concealment accordingly.

In step 201, after decoding one video picture (intra coded picture—I—or predicted picture—P or B—) the lost macroblocks are fed one at a time to the error concealment module which treats each lost MB separately.

TEC is applied first by TEC module 202, resulting in a replacement motion vector and replacement pixels for the lost MB.

The mode selection module 203 uses this estimated replacement MV to decide on the suitability of TEC for concealing the lost MB. The decision can be either to take no further action i.e. to use the replacement pixels provided by the TEC module for concealing the lost MB, or to use SEC instead.

SEC module 204 is used only if the mode selection algorithms decides so. Any SEC method can be used.

Figure 3:
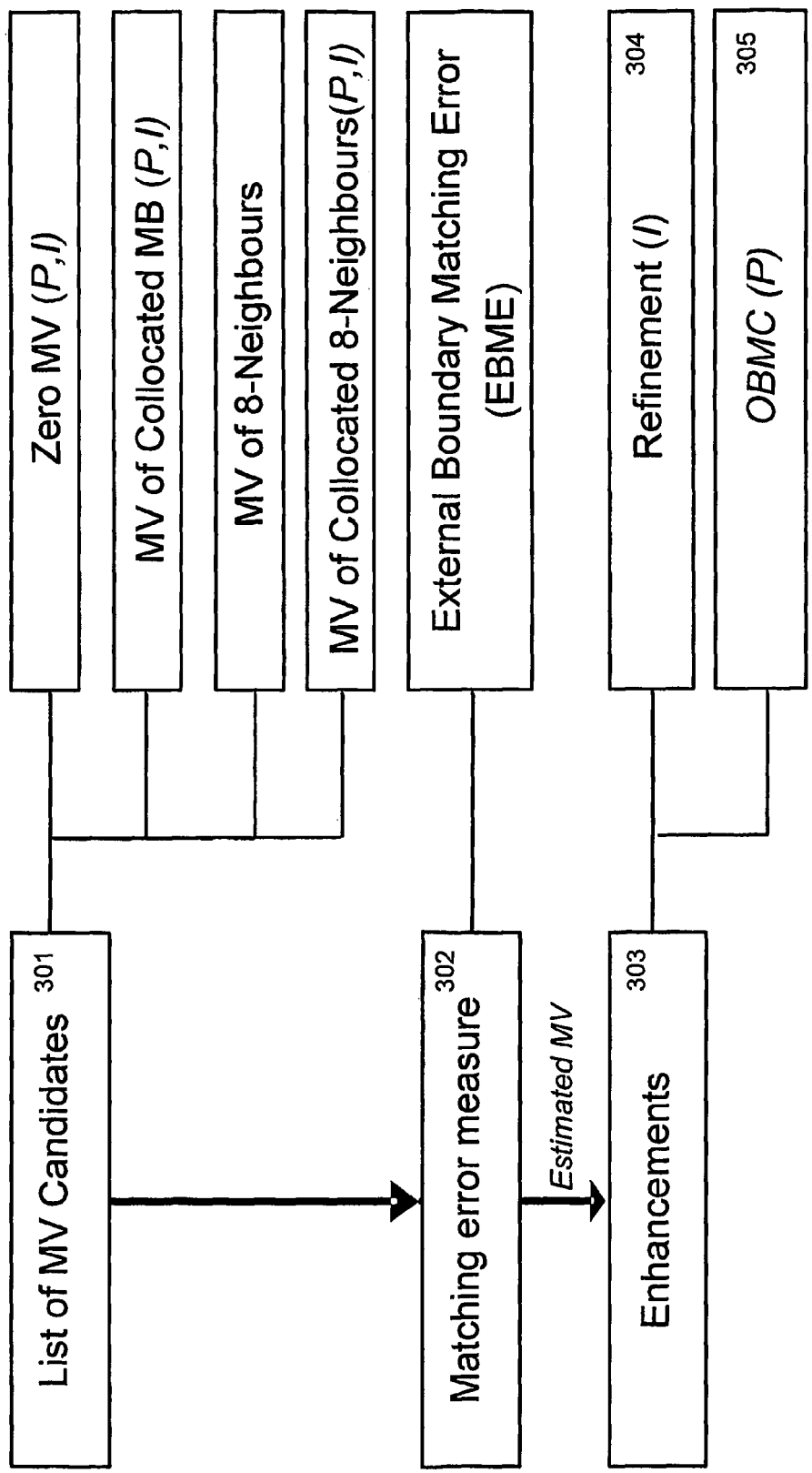
FIG. 3 shows the temporal concealment module in detail.

FIG. 3 shows the temporal concealment module 202 in detail. The first step 301 of the TEC module is to form a list of motion vector candidates in order to find a replacement for the missing MV(s) of the lost MB. The list of MV candidates includes:
  the zero MV;
  a set of motion vectors from the current frame: namely the MY(s) associated with the 8 MBs which neighbor the lost MB;
  a set of motion vectors from a previous reference frame: namely the MV of a collocated MB in the reference frame, and the MV(s) associated with the 8 MBs on the reference frame which neighbor that collocated MB.

This combination of temporal concealment features was formulated based on an extensive study of temporal concealment of lost inter and intra coded macroblocks.

The symbols I, P next to each candidate MV indicate which type of pictures the motion vector candidate is employed for: I—the candidate is used with intra coded pictures, P—the candidate is used with predicted pictures.

The second step 302 of the TEC module is to test each candidate MV in the previously formulated list using a matching error measure. The motion vector that minimises this matching error measure is selected as replacement for the missing MV(s) of the lost macroblock. The matching error measure employed is the external boundary matching error (EBME). EBME is defined as the sum of absolute differences between the pixel boundary of MBs adjacent to the missing one in the current frame and the same boundary of MBs adjacent to the replacement MB (pointed at by the candidate MV) in the reference frame. The pixel boundary preferably is more than one pixel wide: typically two pixels or eight pixels wide. The two-pixel wide version is preferred due to the smaller complexity.

The third and final step 303 of the TEC module applies enhancements to the initial estimation of the replacement motion vector or replacement pixels of the lost MB. The enhancements include the use of overlapped block motion compensation (OBMC) 305 for the replacement of the missing pixels of the lost MBs in P frames and use of motion refinement 304 of the previously estimated (winning) replacement MV in I frames.

Motion refinement 304 uses the selected MV as the starting point for a motion estimation process that searches for better MV replacements, within a specified search region centred on that MV using EBME as the matching measure.

OBMC is performed in step 305 using the method described in [T.-Y. Kuo and S.-C. Tsao, "Error concealment based on overlapping", in VCIP, San Jose, Calif., USA, 2002]. OBMC, as applied for concealment, uses more than one reference MB (and hence more than one estimated MV) for the replacement of damaged pixels. For OBMC, the damaged MB is divided into four 8×8 pixel blocks for each of which four replacement signals are formed using the MV selected in step 302 (referred to below as "the winning MV"), and the MV of the adjacent 8×8 pixel blocks of the 3 neighboring MBs. The four motion compensated replacement signals are then blended according to a raised cosine weighting matrix that favours the MV pointed to by the winning MV for replacing pixels close to the centre of the missing MB.

Figure 4:
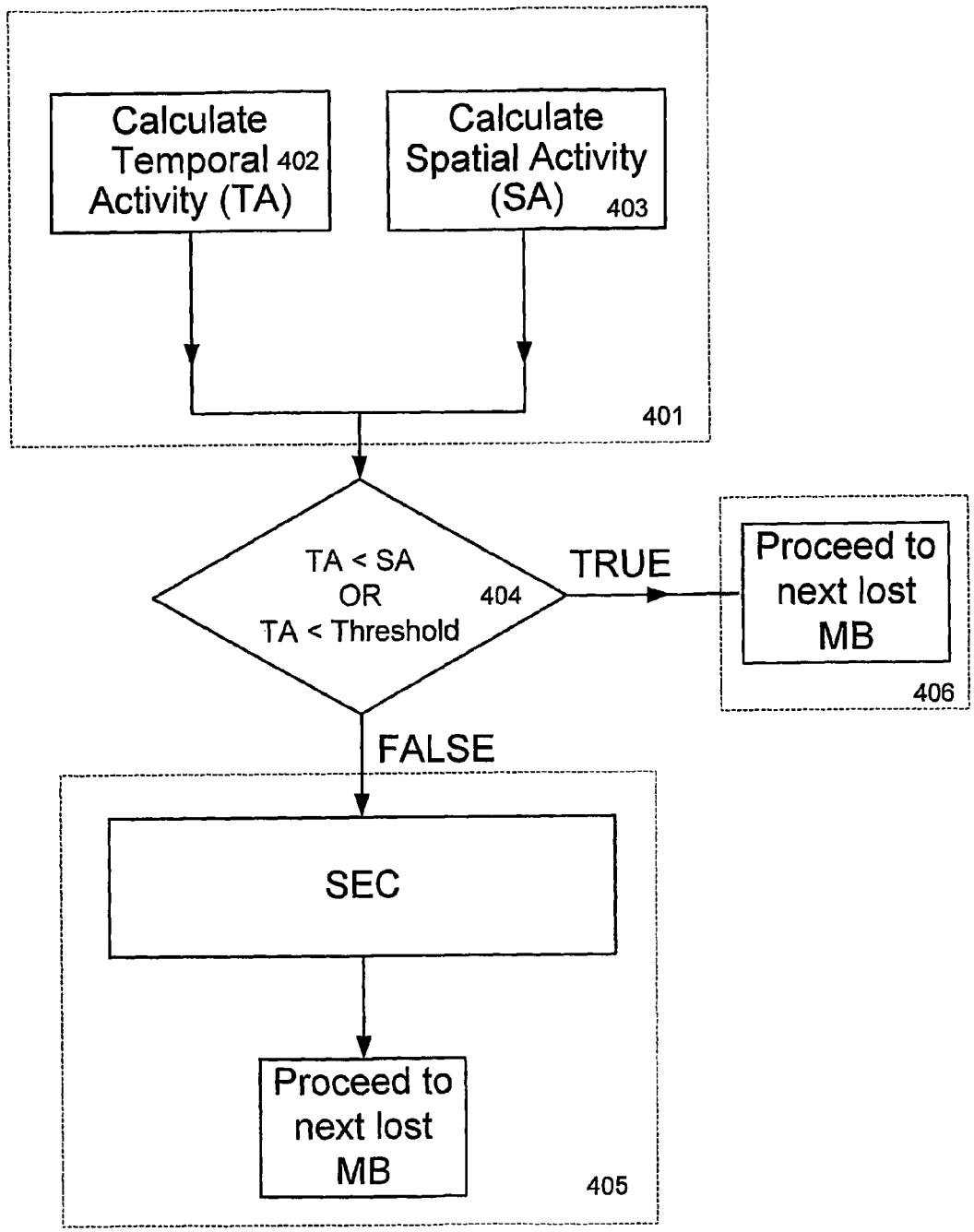
FIG. 4 shows the mode selection module in detail.

FIG. 4 shows the mode selection module in detail including the temporal and spatial activity calculation elements, and the actual decision element that determines whether SEC will be employed for concealing the lost MB.

The mode selection process 203 that takes place after TEC first calculates two activity measures in the neighborhood of the lost MB. These are the motion compensated temporal activity 402 and the spatial activity 403.

Figure 5:
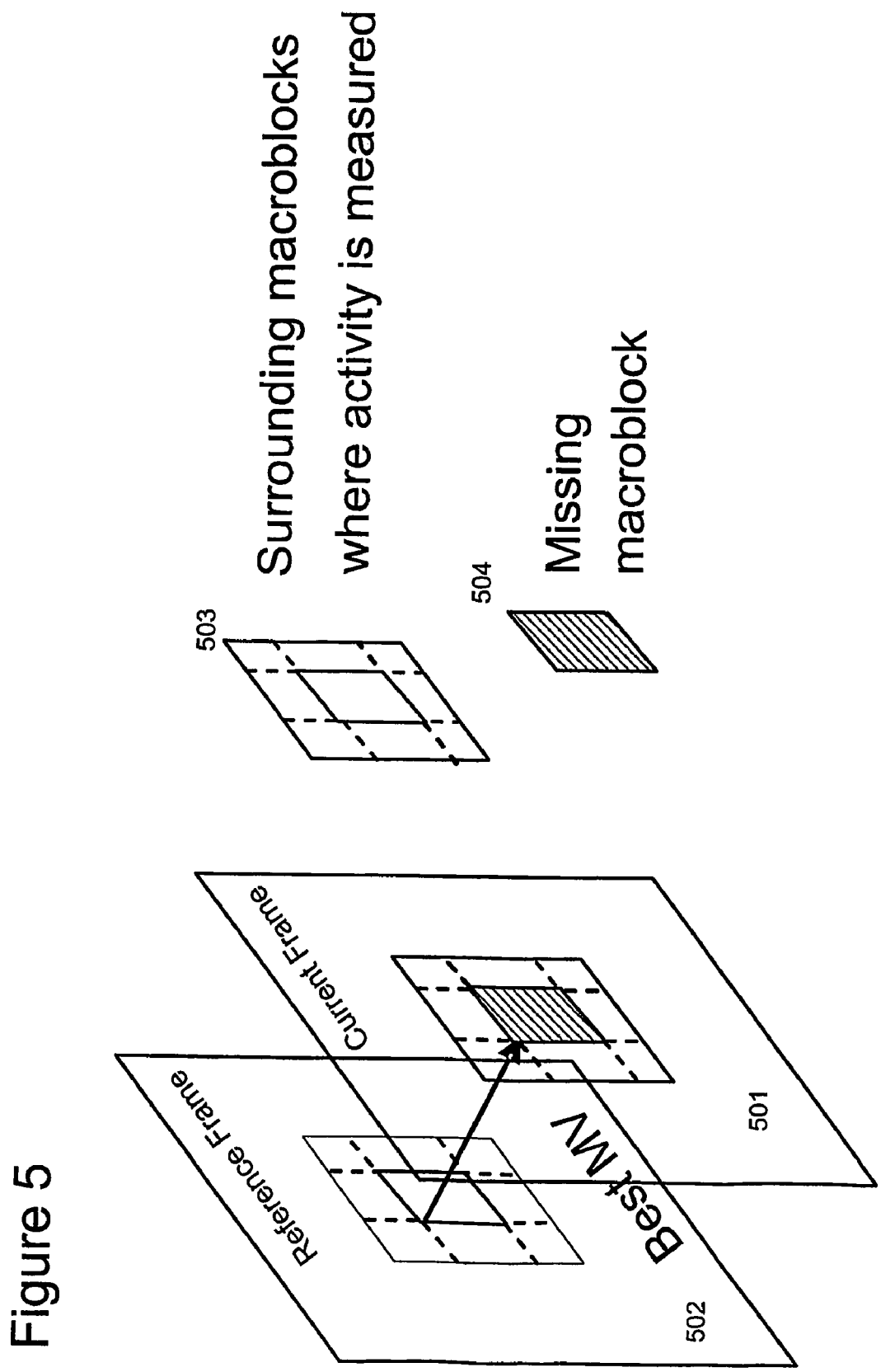
FIG. 5 shows the macroblocks used in the temporal activity calculation that is applied as part of the mode selection module.

The motion compensated temporal activity (TA) 402 is measured as the mean squared error between the MBs surrounding the lost macroblock in the current frame and those surrounding the replacement MB in the reference frame (that is, the MB in the reference frame which is identified by the MV selected by the TEC module 202). More formally: $TA=E[(x-x^*)^2]$ where x are the pixels in the neighborhood of the missing MB and x* are the pixels in the neighborhood of the replacement MB in the reference frame as shown in FIG. 5.

Spatial activity (SA) 403 is measured as the variance of the MBs surrounding the lost macroblock in the current frame. More formally: $SA=E[(x-\mu)^2]$ where x are the pixels in the neighborhood of the missing MB and $\mu$ is the mean value (luminance) of these pixels.

In step 404 the mode decision algorithm uses the two activity measures in the following way for choosing between TEC and SEC as the method for concealing the lost MB:
IF (TA<SA) OR (TA<threshold) apply TEC ELSE apply SEC SEC is employed in step 405 only if the spatial activity is smaller than the temporal activity and the latter is above a specific threshold.

Otherwise the algorithm proceeds to step 406 in which no further action is taken and the result of the TEC module remains unaltered.

Although the invention has been described above with reference to a preferred embodiment, it will be appreciated that various changes or modifications may be made without departing from the scope of the invention as defined in the appended claims.

The invention claimed is:

1. A method of concealing an error in a video stream, the video stream comprising a current frame having a lost image region, and a reference frame, the method comprising:
  using a motion vector to identify a reference image region in the reference frame;
  calculating a motion compensated temporal activity of an image region in the current frame based on a comparison between the image region in the current frame and the reference image region in the reference frame;
  calculating a spatial activity of the image region in the current frame and selecting to use either a spatial error concealment module or a temporal error concealment module to conceal the error based on a comparison of the calculated motion compensated temporal activity and the calculated spatial activity; and
  using the selected module to conceal the lost image region, and
  wherein a calculation using the motion compensated temporal error concealment module to identify a replacement motion vector and replacement pixels is performed prior to the calculation of the motion compensated temporal activity and the selection of which module to use.

2. The method of claim 1 further comprising:
  dividing the lost image region into multiple subregions;
  forming multiple replacement signals for each of the subregions using the selected replacement motion vector and the motion vector of one or more neighboring subregions;

blending the multiple replacement signals to generate a blended replacement signal; and using the blended replacement signal to conceal the lost image region.

3. The method of claim 1 wherein the matching error measure for each motion vector candidate is calculated by calculating a sum of absolute differences between a pixel boundary adjacent to the lost image region and a pixel boundary adjacent to a replacement image region in a reference frame identified by the motion vector candidate.

4. The method of claim 1 wherein the current frame is an intra-coded frame.

5. A video decoder configured to decode a video stream and conceal an error in the video stream by the method of claim 1.

6. The method of claim 1 further comprising:

calculating the motion vector by forming a list of motion vector candidates;

testing each of the motion vector candidates using a matching error measure; and selecting a replacement motion vector from the list based on the matching error measures.

7. The method of claim 6 wherein the list of motion vector candidates includes a set of one or more motion vectors from the current frame and a set of one or more motion vectors from the reference frame.

8. The method of claim 6 further comprising:

performing motion refinement by forming a list of motion vector candidates using the selected replacement motion vector as a starting point;

testing each of the motion vector candidates in the list using a matching error measure;

selecting a motion refined replacement motion vector from the list based on the matching error measures; and using the selected motion refined replacement motion vector to conceal the lost image region.

9. The method of claim 6 wherein the list of motion vector candidates comprises a set of motion vectors each associated with a neighboring image region in the current frame which neighbors the lost image region.

10. The method of claim 6 wherein the list of motion vector candidates comprises a motion vector associated with a collocated image region in the reference frame, the collocated image region being collocated with the lost image region.

11. The method of claim 6 wherein the list of motion vector candidates comprises a set of motion vectors each associated with a neighboring image region in the reference frame which neighbors a collocated image region in the reference frame, the collocated image region being collocated with the lost image region.

* * * * *